US00RE41779E

(19) United States
(12) Reissued Patent
Ise et al.

(10) Patent Number: US RE41,779 E
(45) Date of Reissued Patent: *Sep. 28, 2010

(54) TONER BOTTLE AND DEVELOPER CARTRIDGE FOR USE IN AN IMAGE FORMING APPARATUS

(75) Inventors: Tokihiko Ise, Yokohamashi (JP); Yoshiharu Taniyama, Kawasakishi (JP); Shinichi Itoh, Yokohamashi (JP)

(73) Assignee: Toshiba Tec Kabushiki Kaisha, Tokyo (JP)

( * ) Notice: This patent is subject to a terminal disclaimer.

(21) Appl. No.: 11/949,841

(22) Filed: Dec. 4, 2007

Related U.S. Patent Documents

Reissue of:
(64) Patent No.: 6,334,037
Issued: Dec. 25, 2001
Appl. No.: 09/506,327
Filed: Feb. 18, 2000

U.S. Applications:

(63) Continuation of application No. 10/745,476, filed on Dec. 24, 2003, now Pat. No. Re. 40,021.

(51) Int. Cl.
*G03G 15/08* (2006.01)

(52) U.S. Cl. ..... 399/262; 399/260
(58) Field of Classification Search ..... 399/260, 399/262, 119, 258, 27
See application file for complete search history.

(56) References Cited

U.S. PATENT DOCUMENTS 3,581,949 A 6/1971 Conrad et al.

(Continued)

FOREIGN PATENT DOCUMENTS

CN 01200796 X 12/2001

(Continued)

OTHER PUBLICATIONS

U.S. Appl. No. 10/658,849, filed Sep. 10, 2003, Umezaea et al.
U.S. Appl. No. 10/691,436, filed Oct. 22, 2003, Taniyama et al.

(Continued)

*Primary Examiner*—Susan S Lee
(74) *Attorney, Agent, or Firm*—Foley & Lardner LLP

(57) ABSTRACT

[A developer cartridge which is rotatably mounted in the developing unit of an image forming apparatus, and supplies a developer to the developing unit while rotating includes a cylindrical cartridge main body having a developer outlet hole in the outer surface near one end, and a ring-like cartridge-side shutter which is fitted on the outer surface near one end of the cylindrical cartridge main body to be movable along the rotating shaft of the cylindrical cartridge main body between a position where the developer outlet hole is opened and a position where the developer outlet hole is closed. The developing unit has a guide for inserting the developer cartridge and a driving unit for rotating the developer cartridge, and the guide has a main body-side shutter with a hole. When the developer cartridge is mounted, the cartridge-side shutter moves from the position where the developer outlet hole is closed to the position where the developer outlet hole is opened, and the developer outlet hole aligns itself with the hole of the main body-side shutter. The cylindrical cartridge main body and the main body-side shutter integrally rotate to align the developer outlet hole and the hole of the main body-side shutter with a developer replenishment port formed below the main body-side shutter. Every time this happens, the developer in the developer cartridge is supplied from the developer replenishment port to the developing unit via the developer outlet hole and the hole of the main body-side shutter.] *A toner bottle for use in an image forming apparatus includes an elongated cylindrical body portion having an outer surface. The toner bottle also includes a first end portion at a first end of the cylindrical body portion, the first end portion including an end face, a toner outlet port positioned at the first end portion. The toner bottle further includes a cartridge shutter positioned at the first end portion and configured to be axially movable. The toner bottle still further includes at least one disconnection prevention projection formed at the first end portion to limit axial movement of the cartridge shutter in a direction toward the end face, thereby preventing the cartridge shutter from disconnection from the toner bottle, when the cartridge shutter is located at the closed position.*

10 Claims, 9 Drawing Sheets

U.S. PATENT DOCUMENTS

| | | | |
|---|---|---|---|
| 3,669,072 | A | 6/1972 | Reynolds et al. |
| 3,721,360 | A | 3/1973 | Collie |
| 4,060,105 | A | 11/1977 | Feldeisen et al. |
| 4,436,414 | A | 3/1984 | Kamiyama et al. |
| 4,740,808 | A | 4/1988 | Kasamura et al. |
| 4,878,603 | A | 11/1989 | Ikesue et al. |
| 4,961,088 | A | 10/1990 | Gilliland et al. |
| 4,963,939 | A | 10/1990 | Kurando et al. |
| 4,978,995 | A | 12/1990 | Takahashi |
| 5,088,144 | A | 2/1992 | Schneider |
| 5,208,637 | A | 5/1993 | Landa |
| 5,296,900 | A | 3/1994 | Saijo et al. |
| 5,319,426 | A | 6/1994 | Baruch et al. |
| 5,331,381 | A | 7/1994 | Ota et al. |
| D356,813 | S | 3/1995 | Ichikawa et al. |
| 5,441,177 | A | 8/1995 | Yanagisawa |
| 5,455,662 | A | 10/1995 | Ichikawa et al. |
| 5,475,469 | A | 12/1995 | Okada et al. |
| 5,500,719 | A | 3/1996 | Ichikawa et al. |
| 5,528,349 | A | 6/1996 | Satake |
| 5,534,988 | A | 7/1996 | Gerbasi |
| 5,541,715 | A | 7/1996 | Katoh et al. |
| 5,557,381 | A | 9/1996 | Sakamoto et al. |
| 5,585,899 | A | 12/1996 | Palumbo et al. |
| 5,589,915 | A | 12/1996 | Hashimoto |
| 5,627,631 | A | 5/1997 | Ichikawa et al. |
| 5,737,668 | A | 4/1998 | Johroku |
| 5,761,566 | A | 6/1998 | Suzuki et al. |
| 5,774,772 | A | 6/1998 | Kai et al. |
| 5,774,773 | A | 6/1998 | Otsuka et al. |
| 5,794,108 | A | 8/1998 | Yoshizawa et al. |
| 5,812,915 | A | 9/1998 | Farkash |
| D403,348 | S | 12/1998 | Matsuoka et al. |
| 5,857,129 | A | 1/1999 | Harris |
| D406,162 | S | 2/1999 | Tatsumi |
| 5,867,757 | A | 2/1999 | Okazaki et al. |
| 5,890,040 | A | 3/1999 | Matsuoka et al. |
| 5,907,756 | A | 5/1999 | Shirota et al. |
| 5,908,124 | A | 6/1999 | Klauke et al. |
| 5,909,610 | A | 6/1999 | Yoshiki et al. |
| 5,918,090 | A | 6/1999 | Ichikawa et al. |
| 5,918,095 | A | 6/1999 | Huang |
| 5,966,574 | A | 10/1999 | Ui et al. |
| 5,970,273 | A | 10/1999 | Zenk et al. |
| 5,970,290 | A | 10/1999 | Yoshiki et al. |
| 5,970,291 | A | 10/1999 | Miller |
| 5,970,293 | A | 10/1999 | Huang |
| 5,983,059 | A | 11/1999 | Oka et al. |
| 5,991,584 | A | 11/1999 | Meyer et al. |
| 5,999,759 | A | 12/1999 | Palumbo et al. |
| 6,019,461 | A | 2/2000 | Yoshimura et al. |
| 6,032,010 | A | 2/2000 | Kim et al. |
| 6,032,013 | A | 2/2000 | Niizawa |
| 6,038,422 | A | 3/2000 | Loewel |
| 6,064,846 | A | 5/2000 | Wang et al. |
| 6,067,423 | A | 5/2000 | Smith et al. |
| 6,067,432 | A | 5/2000 | Huang |
| 6,075,963 | A | 6/2000 | Ichikawa et al. |
| 6,091,920 | A | 7/2000 | Kita et al. |
| D430,197 | S | 8/2000 | Wang et al. |
| 6,097,903 | A | 8/2000 | Yahata et al. |
| 6,104,902 | A | 8/2000 | Meyer et al. |
| 6,118,951 | A | 9/2000 | Kato et al. |
| D431,595 | S | 10/2000 | Wang et al. |
| 6,128,453 | A | 10/2000 | Ban et al. |
| 6,134,411 | A | 10/2000 | Meyer et al. |
| 6,137,972 | A | 10/2000 | Playfair et al. |
| 6,151,459 | A | 11/2000 | Hashimoto et al. |
| D436,121 | S | 1/2001 | Wang et al. |
| D437,346 | S | 2/2001 | Wang et al. |
| D437,347 | S | 2/2001 | Wang et al. |
| 6,188,859 | B1 | 2/2001 | Wang et al. |
| 6,229,976 | B1 | 5/2001 | Kimura |
| 6,229,977 | B1 | 5/2001 | Wang et al. |
| 6,233,421 | B1 | 5/2001 | Wang et al. |
| 6,240,262 | B1 | 5/2001 | Taniyama et al. |
| 6,256,469 | B1 | 7/2001 | Taniyama et al. |
| 6,256,470 | B1 | 7/2001 | Taniyama et al. |
| 6,259,877 | B1 | 7/2001 | Taniyama et al. |
| D447,167 | S | 8/2001 | Taniyama |
| 6,289,182 | B1 | 9/2001 | Umezawa et al. |
| 6,308,017 | B1 | 10/2001 | Taniyama et al. |
| 6,308,036 | B1 | 10/2001 | Taniyama et al. |
| 6,334,037 | B1 | 12/2001 | Ise |
| 6,343,883 | B1 | 2/2002 | Tada et al. |
| 6,347,195 | B1 | 2/2002 | Saiki et al. |
| D458,301 | S | 6/2002 | Wang et al. |
| D458,302 | S | 6/2002 | Wang et al. |
| D458,960 | S | 6/2002 | Wang et al. |
| D458,961 | S | 6/2002 | Wang et al. |
| D458,962 | S | 6/2002 | Wang et al. |
| 6,405,011 | B1 | 6/2002 | Wang et al. |
| 6,477,335 | B1 | 11/2002 | Surya et al. |
| 6,505,006 | B1 | 1/2003 | Solanki et al. |
| D473,588 | S | 4/2003 | Jui-Chi et al. |
| 6,542,709 | B1 | 4/2003 | Wang et al. |
| 6,785,497 | B1 * | 8/2004 | Hasebe ..... 399/260 |
| RE40,021 | E * | 1/2008 | Ise et al. ..... 399/262 |

FOREIGN PATENT DOCUMENTS

| | | | |
|---|---|---|---|
| DE | 298 13 603 | U1 | 12/1998 |
| DE | 299 06 174 | U1 | 8/1999 |
| DE | 299 14 516 | U1 | 1/2000 |
| DE | 201 01 041 | U1 | 6/2001 |
| DE | 201 10 369 | U1 | 10/2001 |
| DE | 202 06 622 | U1 | 10/2002 |
| JP | 56-66959 | U | 6/1981 |
| JP | 60-101571 | | 6/1985 |
| JP | 60-153066 | | 8/1985 |
| JP | 61-99176 | | 5/1986 |
| JP | 61-215575 | | 9/1986 |
| JP | 62-89672 | U | 5/1987 |
| JP | 62-173482 | | 7/1987 |
| JP | 63-75769 | | 4/1988 |
| JP | 63-82493 | | 4/1988 |
| JP | 63-94267 | | 4/1988 |
| JP | 63-122939 | | 5/1988 |
| JP | 63-224986 | | 9/1988 |
| JP | 1-255875 | | 10/1989 |
| JP | 2-16366 | Y | 5/1990 |
| JP | 3-2369 | U | 1/1991 |
| JP | 3-153271 | | 7/1991 |
| JP | 4-477 | | 1/1992 |
| JP | 4-1682 | | 1/1992 |
| JP | 4-60669 | | 2/1992 |
| JP | 4-62564 | | 2/1992 |
| JP | 5-40112 | U | 5/1993 |
| JP | 5-224479 | | 9/1993 |
| JP | 5-81855 | U | 11/1993 |
| JP | 5-333749 | | 12/1993 |
| JP | 6-35320 | | 2/1994 |
| JP | 6-149047 | | 5/1994 |
| JP | 6-149048 | | 5/1994 |
| JP | 6-149051 | | 5/1994 |
| JP | 6-149061 | | 5/1994 |
| JP | 6-222665 | A | 8/1994 |
| JP | 6-266227 | | 9/1994 |
| JP | 6-316060 | | 11/1994 |
| JP | 7-20703 | | 1/1995 |
| JP | 7-181788 | | 7/1995 |
| JP | 7-191539 | | 7/1995 |

| | | | |
|---|---|---|---|
| JP | 7-199574 | | 8/1995 |
| JP | 7-199618 | | 8/1995 |
| JP | 8-137364 | | 5/1996 |
| JP | 9-90727 | | 4/1997 |
| JP | 9-185311 | | 7/1997 |
| JP | 9-211947 | | 8/1997 |
| JP | 9-211977 | | 8/1997 |
| JP | 9-244369 | | 9/1997 |
| JP | 10-20642 | | 1/1998 |
| JP | 10-48936 | | 2/1998 |
| JP | 10-171230 | A | 6/1998 |
| JP | 10-171231 | | 6/1998 |
| JP | 10-213957 | | 8/1998 |
| JP | 10-260574 | | 9/1998 |
| JP | 10-319705 | | 12/1998 |
| JP | 11-65252 | | 3/1999 |
| JP | 11-65390 | | 3/1999 |
| JP | 11-184232 | | 7/1999 |
| JP | 11-327272 | | 11/1999 |
| JP | 11-338210 | | 12/1999 |
| JP | 2000-19828 | | 1/2000 |
| JP | 2000-47466 | | 2/2000 |
| JP | 2000-098725 | A | 4/2000 |
| JP | 2000-221866 | | 8/2000 |
| JP | 2000-321860 | | 11/2000 |
| JP | 2000-347503 | | 12/2000 |
| JP | 2001-117458 | | 4/2001 |
| JP | 2001-175080 | | 6/2001 |
| TW | 450900 | | 6/1998 |
| TW | 467298 | | 1/2000 |
| TW | 472898 | | 3/2000 |
| TW | 431308 | | 5/2000 |

OTHER PUBLICATIONS

U.S. Appl. No. 11/955,987, filed Dec. 13, 2007, Noriyuki Umezawa et al.

N. Umezawa, U.S. PTO Action, U.S. Appl. No. 11/955,987, dated Sep. 21, 2009, 1–8 pages.

N. Umezawa, U.S. PTO Final Office Action, U.S. Appl. No. 11/955,987, dated Mar. 8, 2010, 7 pages.

* cited by examiner

TONER BOTTLE AND DEVELOPER CARTRIDGE FOR USE IN AN IMAGE FORMING APPARATUS

Matter enclosed in heavy brackets [ ] appears in the original patent but forms no part of this reissue specification; matter printed in italics indicates the additions made by reissue.

*CROSS REFERENCE TO RELATED APPLICATIONS*

*The present application is a continuation reissue based upon U.S. application Ser. No. 10/745,476, filed Dec. 24, 2003 now U.S. Pat. No. RE 40,021, which is a reissue of U.S. Pat. No. 6,334,037; the entire contents of all of which are incorporated herein by reference.*

BACKGROUND OF THE INVENTION

The present invention relates to an image forming apparatus and, more particularly, to an improvement in the developer replenishment mechanism of the image forming apparatus.

An image forming apparatus for forming an electrostatic latent image on an image carrier, developing the image with toner in a developing unit, and transferring the toner image onto a sheet, comprises a container (toner cartridge or toner bottle) for replenishing the developing unit with toner. This toner cartridge has a spiral on its inner surface. When the toner cartridge itself rotates, the contained toner is squeezed out from an outlet port along the spiral and supplied to the developing unit.

The outlet port of the toner cartridge is open in mounting a new toner cartridge on the apparatus main body or dismounting an empty toner cartridge from the apparatus main body. For this reason, toner escapes from the outlet port and scatters in the apparatus to contaminate the apparatus.

BRIEF SUMMARY OF THE INVENTION

It is an object of the present invention to provide a developer cartridge which prevents a developer from escaping from a outlet port and scattering in an apparatus in mounting/dismounting on/from the apparatus main body.

It is another object of the present invention to provide an image forming apparatus having the developer cartridge which prevents a developer from escaping from the outlet port and scattering in the apparatus in mounting/dismounting on/from the apparatus main body.

According to the present invention, there is provided a developer cartridge which is rotatably mounted in a developing unit of an image forming apparatus, and supplies a developer to the developing unit while rotating, comprising a cylindrical cartridge main body having a developer outlet hole in an outer surface near one end, and a ring-like cartridge-side shutter which is fitted on the outer surface near one end of the cylindrical cartridge main body to be movable along a rotating shaft of the cylindrical cartridge main body between a position where the developer outlet hole is opened and a position where the developer outlet hole is closed, wherein the developing unit has a guide for inserting the developer cartridge and a driving unit for rotating the developer cartridge, the guide has a main body-side shutter with a hole, and when the developer cartridge is mounted, the cartridge-side shutter of the cylindrical cartridge main body moves from the position where the developer outlet hole is closed to the position where the developer outlet hole is opened, the developer outlet hole aligns itself with the hole of the main body-side shutter, and every time the cylindrical cartridge main body and the main body-side shutter integrally rotate to align the developer outlet hole and the hole of the main body-side shutter with a developer replenishment port formed below the main body-side shutter, the developer in the developer cartridge is supplied from the developer replenishment port to the developing unit via the developer outlet hole and the hole of the main body-side shutter.

According to the present invention, there is provided an image forming apparatus comprising a developing unit for developing an electrostatic latent image on an image carrier with a developer, and a transfer unit for transferring the developed developer image onto a transfer medium, wherein the developing unit has a developer cartridge rotatably mounted to supply the developer to the developing unit while rotating, a guide for inserting the developer cartridge, and a driving unit for rotating the developer cartridge; the developer cartridge has a cylindrical cartridge main body having a developer outlet hole in an outer surface near one end, and a ring-like cartridge-side shutter which is fitted on the outer surface near one end of the cylindrical cartridge main body to be movable along a rotating shaft of the cylindrical cartridge main body between a position where the developer outlet hole is opened and a position where the developer outlet hole is closed; the guide has a main body-side shutter with a hole; and when the developer cartridge is mounted, the cartridge-side shutter of the cylindrical cartridge main body moves from the position where the developer outlet hole is closed to the position where the developer outlet hole is opened, the developer outlet hole aligns itself with the hole of the main body-side shutter, and every time the cylindrical cartridge main body and the main body-side shutter integrally rotate to align the developer outlet hole and the hole of the main body-side shutter with a developer replenishment port formed below the main body-side shutter, the developer in the developer cartridge is supplied from the developer replenishment port to the developing unit via the developer outlet hole and the hole of the main body-side shutter.

Additional objects and advantages of the invention will be set forth in the description which follows, and in part will be obvious from the description, or may be learned by practice of the invention. The objects and advantages of the invention may be realized and obtained by means of the instrumetalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described below with reference to the several views of the accompanying drawing.

Figure 1:
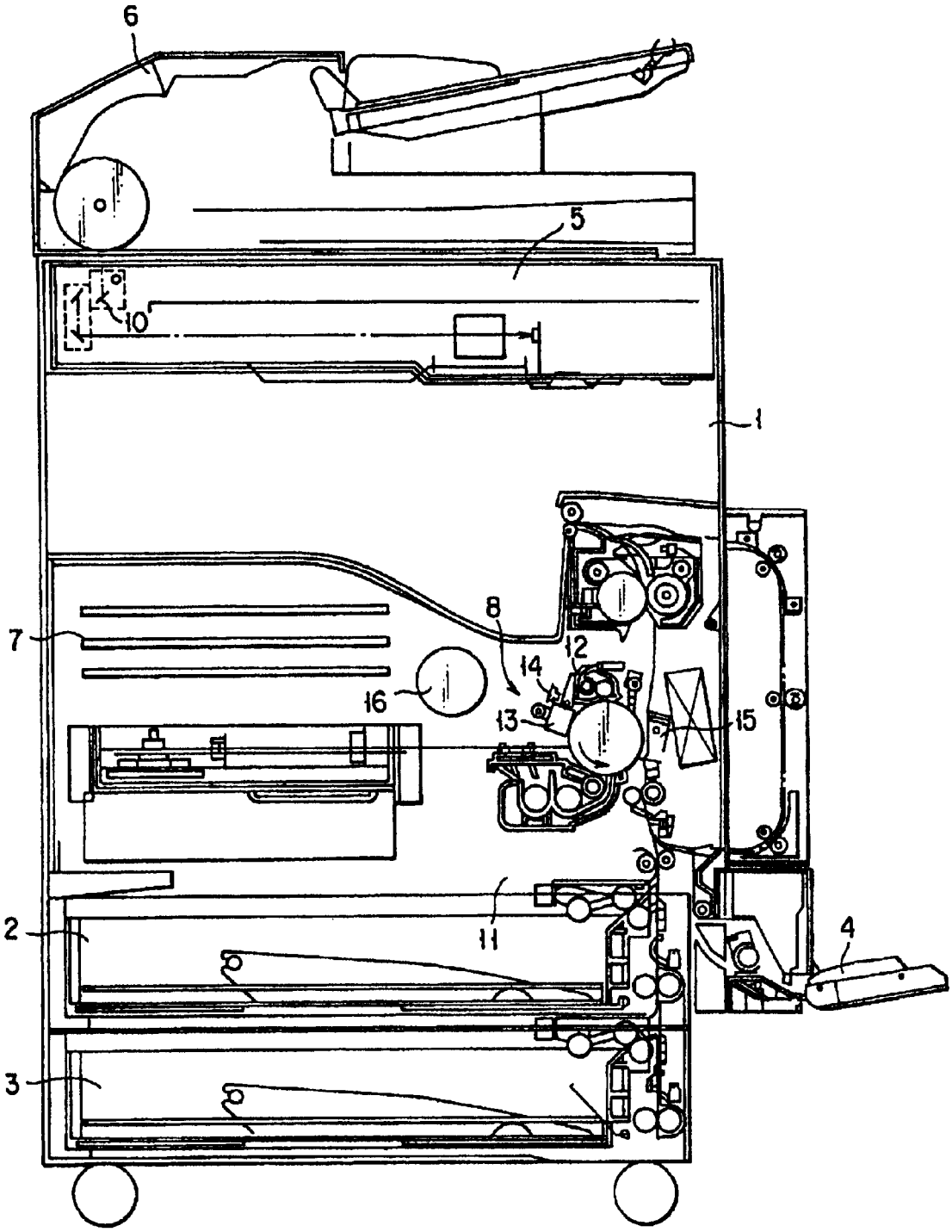
FIG. 1 is a sectional view showing the schematic structure of an image forming apparatus according to an embodiment of the present invention.

FIG. 1 is a sectional view showing a whole copying machine according to a preferred embodiment of the present invention. In FIG. 1, a copying machine 1 comprises at its lower portion a cassette sheet feeder 2 which stores many sheets. The copying machine 1 further comprises an LCF sheet feeder 3 for feeding many sheets of the same size, and a manual sheet feeder 4 capable of feeding various kinds of sheets.

The copying machine 1 comprises at its upper portion an image reading section 5 for reading a document, an automatic document feeder 6 for feeding a document to the image reading section 5, an image storage section 7 for storing image data read by the image reading section 5, and a laser optical device for reading out the stored image data and writing the image on an image forming section 8.

Figure 3A:
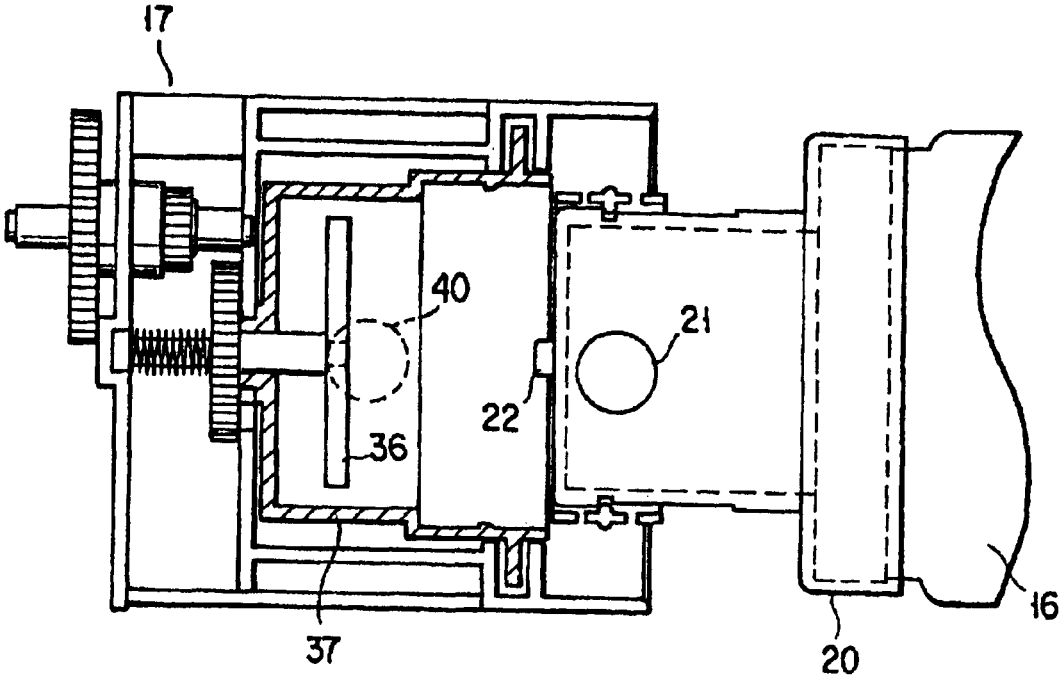
FIGS. 3A and 3B are views showing a state in which a toner cartridge is mounted in the toner replenishment unit.

The image forming section 8 is made up of a photosensitive drum 10, developing unit 11, cleaner 12, charger 13, discharge lamp 14, and transfer/separation charger 15. The developing unit 11 is equipped with a toner cartridge 16 for replenishing the developing unit 11 with toner, and a driving unit 17 for driving the toner cartridge 16, as shown in FIG. 3A.

Figure 3B:
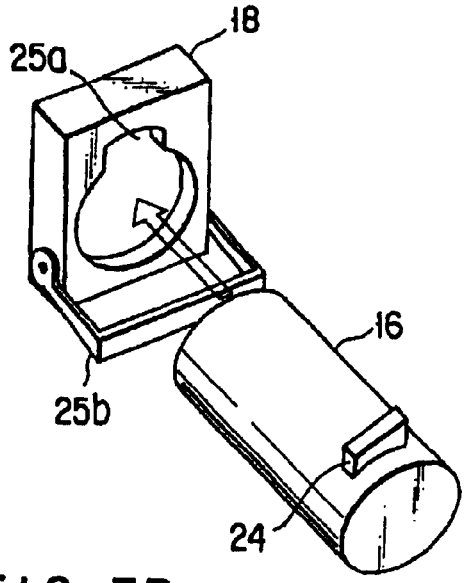

As shown in FIG. 3B, the outer surface of the toner cartridge 16 near its end has a projection 24 for positioning the toner cartridge 16 in mounting it on the copying machine main body. The projection 24 stands at a predetermined position with respect to an outlet hole 21 formed in a cap (constricted portion) 20.

Figure 2:
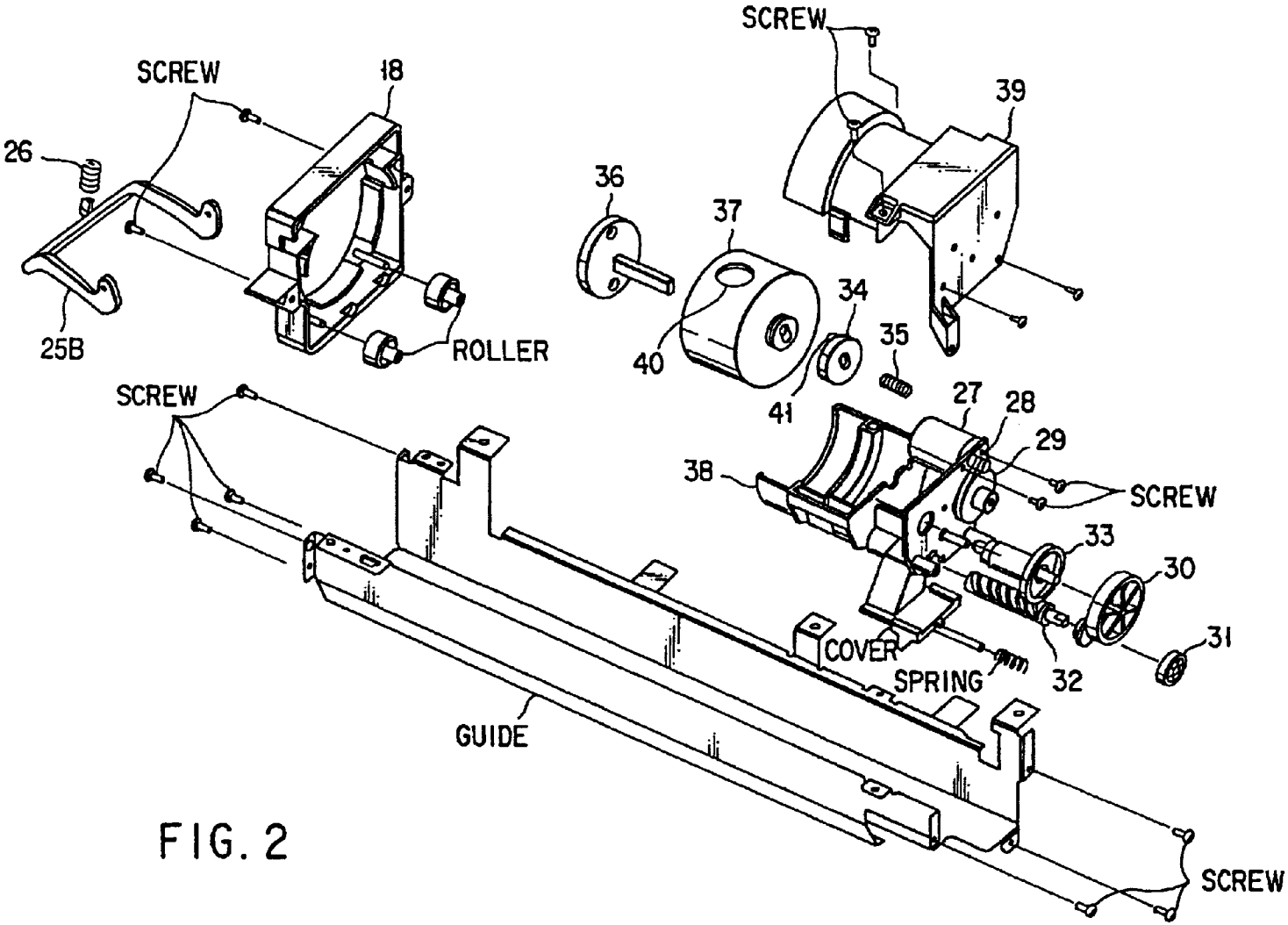
FIG. 2 is an exploded perspective view showing a toner replenishment unit of the image forming apparatus according to the embodiment of the present invention.

FIG. 2 is an exploded perspective view showing the toner replenishment unit of the copying machine main body. FIGS. 3A and 3B are views showing a state in which the toner cartridge is mounted in this toner replenishment unit.

In FIG. 2, an inlet guide 18 is attached to the copying machine main body, and has a guide hole of a size enough to receive the toner cartridge 16. As shown in FIG. 3B, a recess 25a is formed at a predetermined position of the guide hole. The recess 25a fits with the projection 24 formed on the toner cartridge 16.

A mounting lever 25b is attached to the inlet guide 18. Upon mounting the toner cartridge 16, the mounting lever 25b presses the end of the toner cartridge 16 so as to prevent the toner cartridge 16 from popping out. A spring 26 for pressing the toner cartridge 16 into the copying machine main body is attached between the mounting lever 25b and the toner cartridge 16.

As shown in FIG. 3A, the copying machine main body also comprises the driving unit 17 for rotating the toner cartridge 16. As shown in FIG. 2, the driving unit 17 is constituted by a motor 27, belt 28, pulley 29, driving gears 30 and 31, convey auger 32, driving gears 33 and 34, spring 35, driving plate 36, holder guide 37, holder 38, and holder cover 39.

In this driving unit 17, the motor 27 rotates the pulley 29 via the belt 28 to rotate the driving gear 30 meshed with the pulley 29. The driving gear 30 meshes with the driving gears 31 and 33. The convey auger 32 is attached to the driving gear 31 and rotated by it.

The driving gear 33 meshes with the driving gear 34, to which the driving plate 36 is attached.

The driving plate 36 has a driving hole for driving the toner cartridge 16. The driving gear 34 has an elliptical hole. The shaft of the driving plate 36 extends through the elliptical hole to allow the driving gear 34 to slide axially with respect to the driving plate 36. The driving hole of the driving plate 36 is formed at a predetermined position with respect to the elliptical hole of the driving gear 34.

The holder guide 37 also has an elliptical hole. The shaft of the driving plate 36 extends through this elliptical hole to connect the holder guide 37 to the driving gear 34. The holder guide 37 rotates integrally with the driving plate 36 by rotation of the driving gear 34.

The holder guide 37 has a toner replenishment hole 40, which is formed at a predetermined position with respect to the elliptical hole. A projection 41 stands at a predetermined position with respect to the elliptical hole of the driving shaft 34.

As shown in FIG. 3A, the toner cartridge 16 is mounted in the copying machine 1 after the mounting lever 25b on the front of the copying machine 1 is released. At this time, the projection 24 of the toner cartridge 16 meshes with the recess 25a at the guide hole of the inlet guide 18.

The recess 25a is formed at, e.g., an upper portion of the guide hole of the inlet guide 18, and the projection 24 of the toner cartridge 16 corresponds in position with the recess 25a. The cap 20 of the toner cartridge 16 has the outlet hole 21 and a projection 22 at predetermined positions.

The toner cartridge 16 is positioned by the inlet guide 18 to mesh with the driving unit. That is, by positioning the toner cartridge 16 in this manner, the toner replenishment port 40 of the holder guide 37 of the driving unit 17 aligns itself with the outlet port 21 of the cap 20 to enable toner replenishment. At the same time, the projection 22 of the cap 20 fits in the driving hole of the driving plate 36 to enable rotating the toner cartridge 16 by the driving unit 17.

Figure 4A:
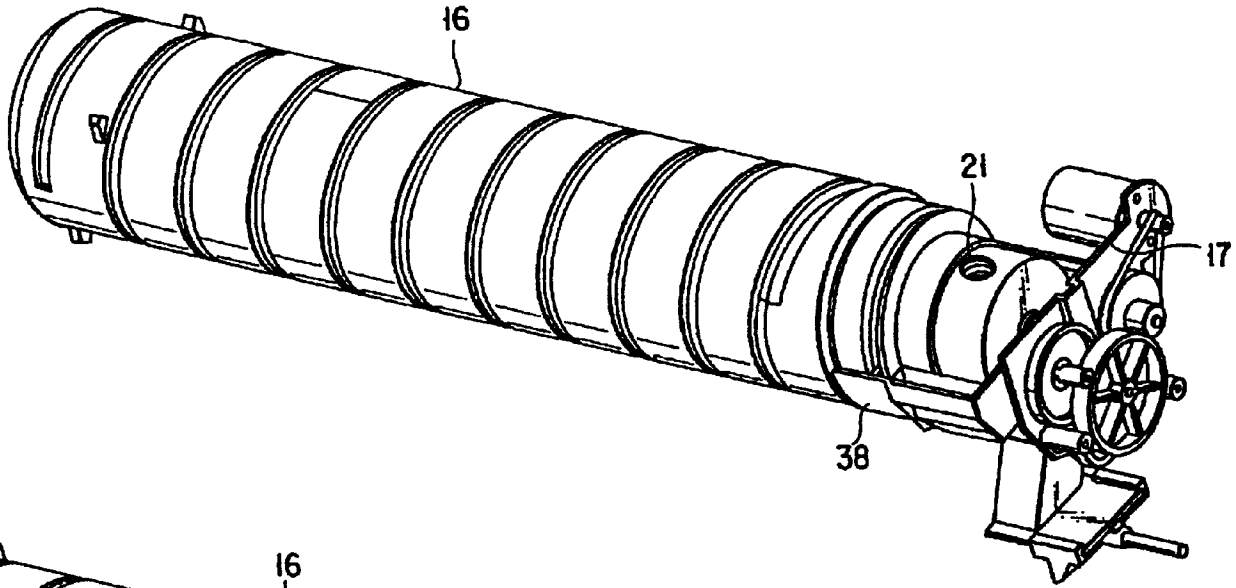
FIGS. 4A and 4B are perspective views showing a state in which the toner cartridge of the image forming apparatus according to the embodiment of the present invention is positioned by an inlet guide to mesh with a driving unit.
Figure 4B:
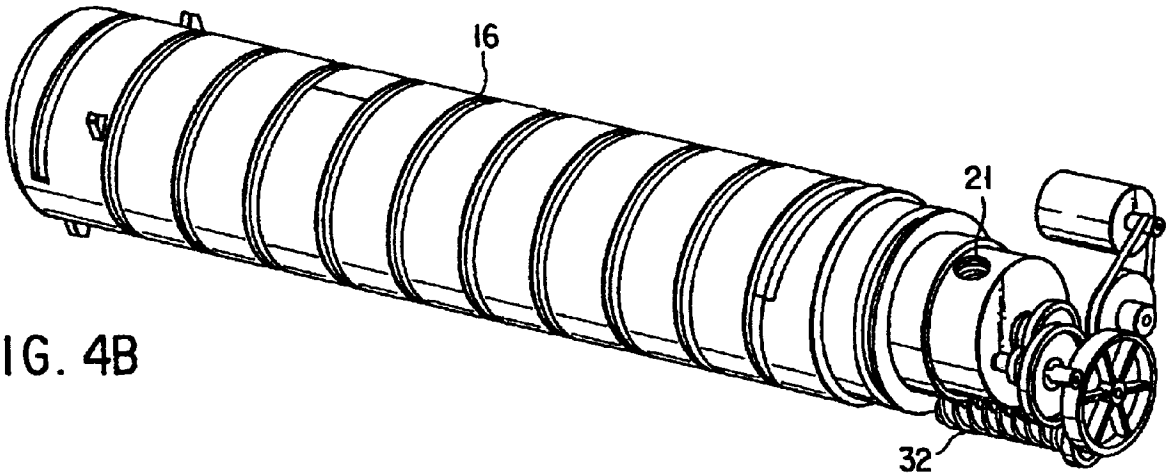

FIGS. 4A and 4B show a state in which the toner cartridge 16 is positioned by the inlet guide 18 to fit with the driving unit. FIG. 4A shows a state in which the inlet guide 18 and holder 38 are mounted, and FIG. 4B shows a state in which the inlet guide 18 and holder 38 are dismounted to expose the convey auger 32.

Figure 5A:
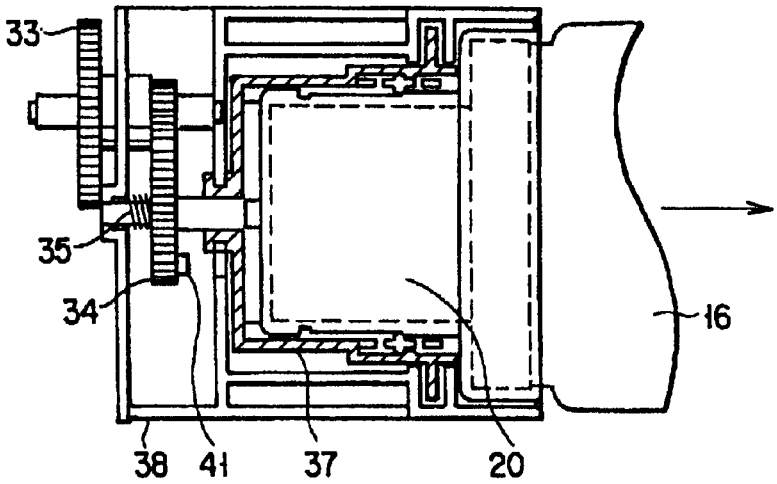
FIGS. 5A, 5B, and 5C are schematic views showing exchange of the toner cartridge.
Figure 5B:
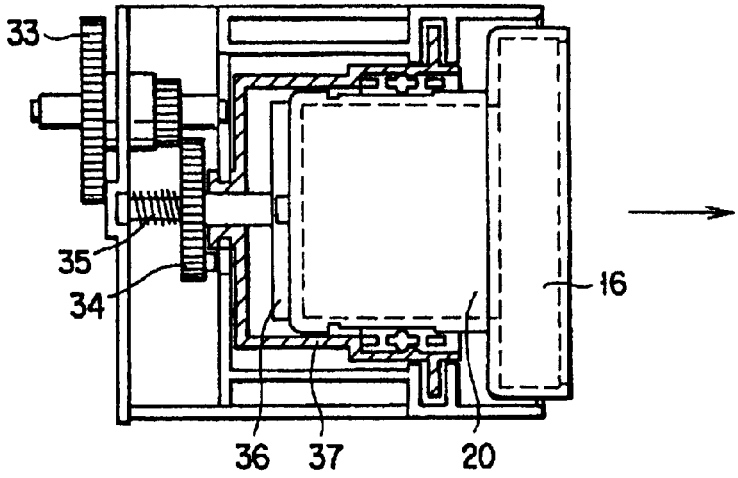
Figure 5C:
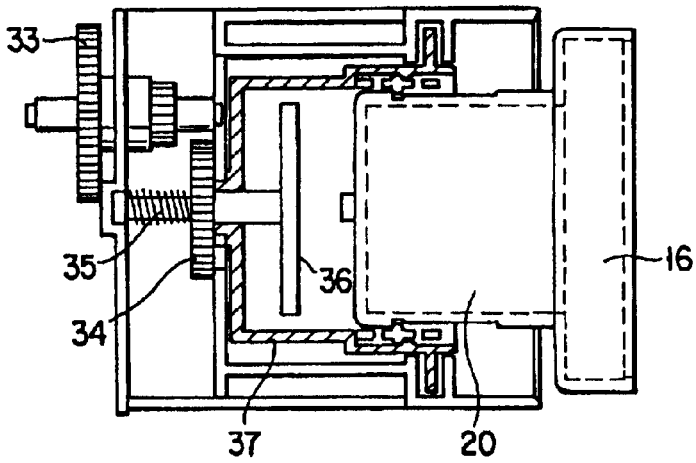

FIGS. 5A to 5C are schematic views showing exchange of the toner cartridge 16.

When toner in the toner cartridge 16 mounted in the copying machine goes empty, an empty sensor arranged in the developing unit 11 displays an empty display on the control panel of the copying machine 1. Then, the user opens the front cover of the copying machine 1 to pull out the toner cartridge 16 axially (to the right on the page).

The toner cartridge 16 is pulled in a direction indicated by an arrow (to the right) from the state shown in FIG. 5A in which the toner cartridge 16 is mounted in the copying machine. FIG. 5B shows a state in which the toner cartridge 16 is pulled by 4 or 5 mm. In this state, the driving gear 34 is pressed to the right by the operation of the spring 35 to release the meshing between the driving gears 33 and 34. Hence, no rotation driving force is transferred from the driving gear 33 to the toner cartridge 16.

Further, the toner cartridge 16 is pulled to the right. FIG. 5C shows a state in which the toner cartridge 16 is pulled by 7 mm from the state of FIG. 5A. In this state, the toner cartridge 16 is disengaged from the driving plate 36.

After the toner cartridge 16 is dismounted, a new toner cartridge is mounted in the copying machine. The mounting procedures are reverse to the dismounting procedures described with reference to FIGS. 5A to 5C.

More specifically, the toner cartridge 16 is set at a predetermined position in the machine main body (state shown in FIG. 5C), and pressed axially (to the left on the page). Then, the projection 22 of the cap 20 fits in the driving hole of the driving plate 36 (state shown in FIG. 5B). In this state, however, the driving gears 33 and 34 do not yet mesh with each other.

The toner cartridge 16 is further axially pressed, and the driving plate 36 and driving gear 34 move to the left against the repulsion force of the spring 35. The driving gear 34 meshes with the driving gear 33 to allow rotation of the toner cartridge 16 by the driving unit 17.

In this case, as described above, the toner replenishment port 40 (not shown in FIGS. 5A to 5C) of the holder guide 37 aligns itself with the outlet port 21 (not shown in FIGS. 5A to 5C) of the cap 20 to enable toner replenishment.

Figure 6:
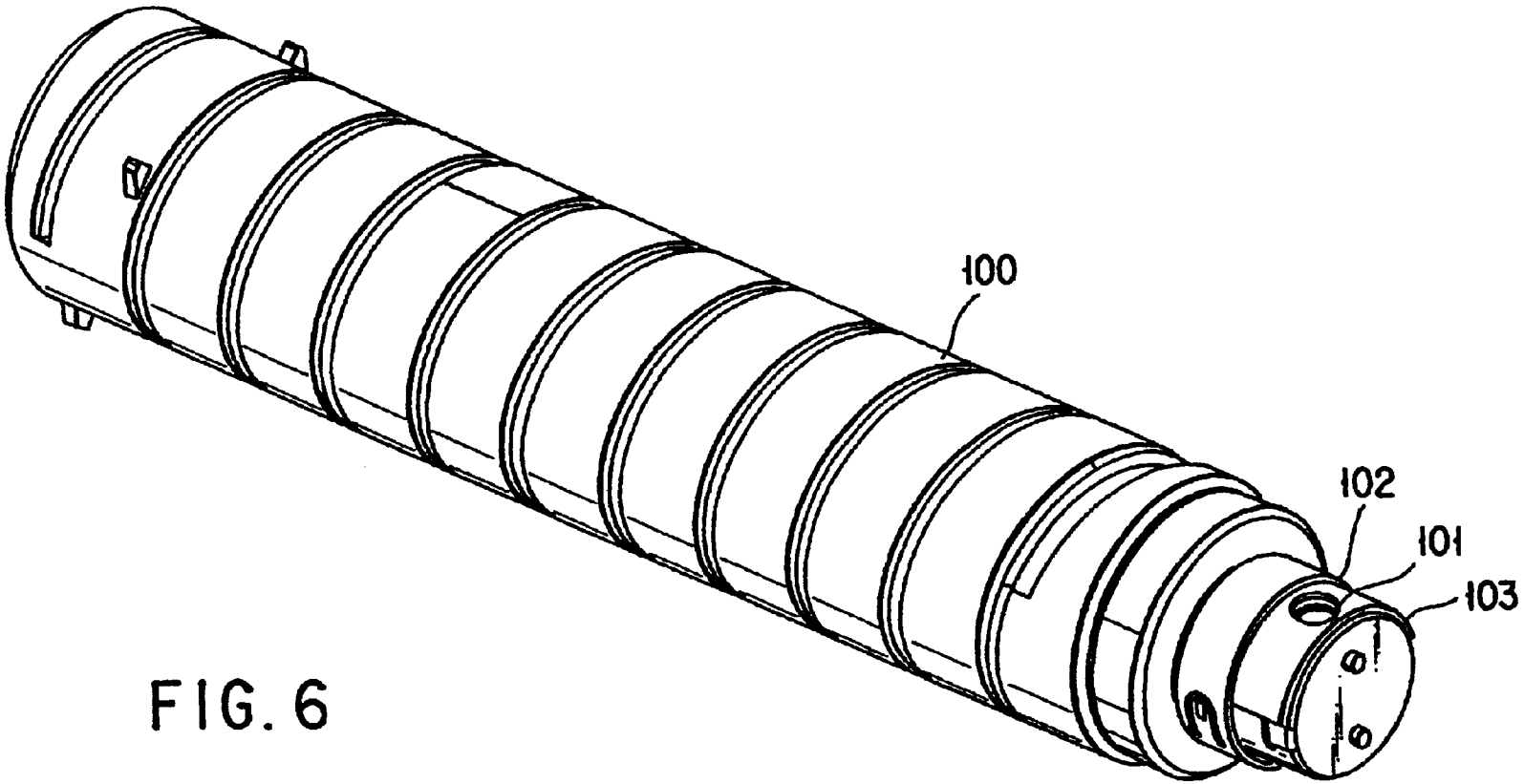
FIG. 6 is a perspective view showing a toner cartridge according to the embodiment of the present invention.

FIG. 6 is a perspective view showing a toner cartridge according to the embodiment of the present invention. In FIG. 6, a toner cartridge 100 has a toner outlet port 101 on the side surface of a constricted portion which is formed at one end of the toner cartridge 100 and inserted into the inlet guide 18. A spiral is formed on the inner surface of the toner cartridge 100. Rotation of the toner cartridge 100 squeezes toner in the toner cartridge 100 along the spiral, and when the toner outlet port 101 faces down, the toner is discharged from the toner outlet port 101.

Figure 7:
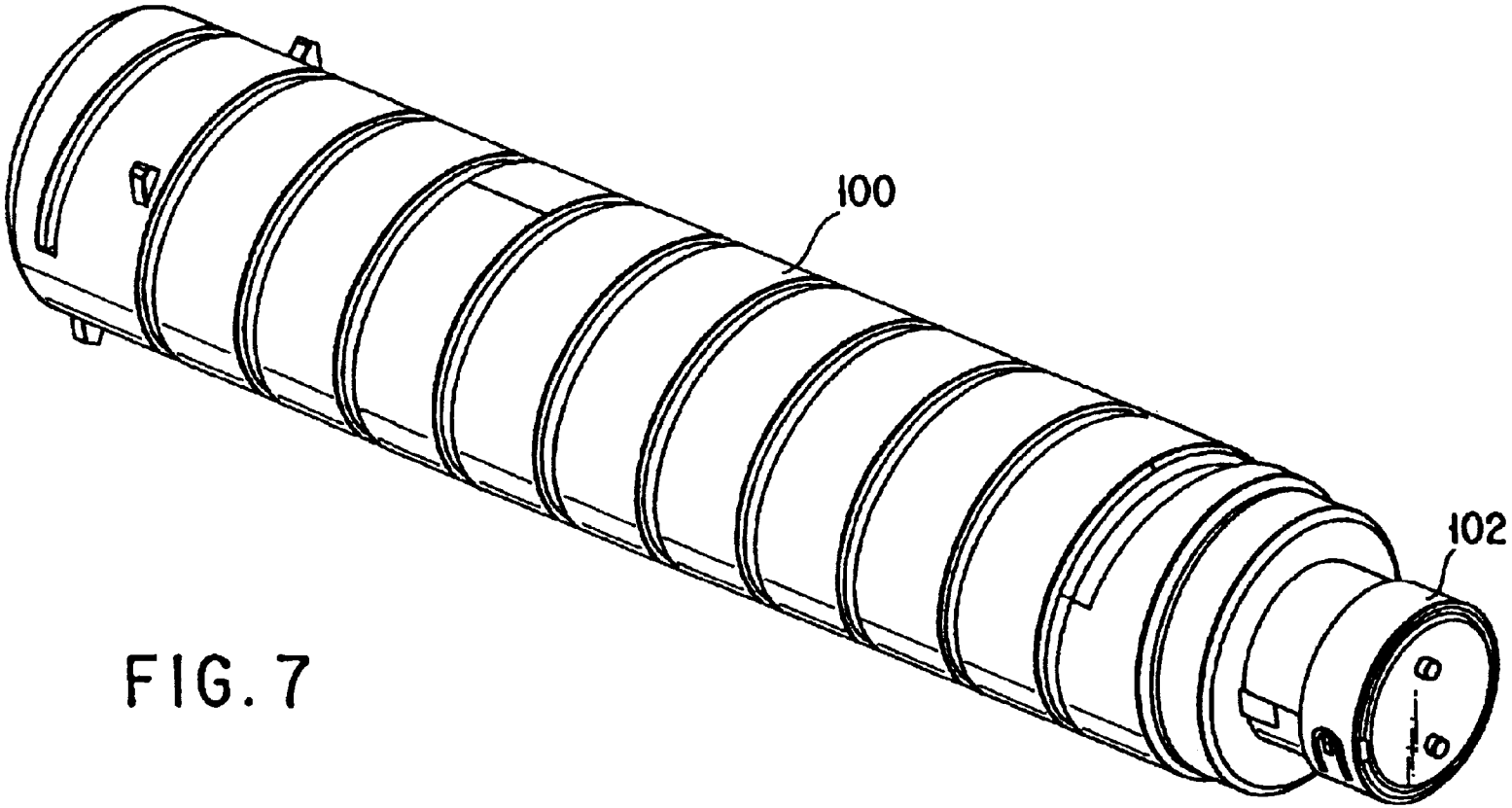
FIG. 7 is a perspective view showing a state in which a cartridge-side shutter covers a toner outlet port in the toner cartridge according to the embodiment of the present invention.

The constricted portion at one end of the toner cartridge 100 is equipped with a cartridge-side shutter 102. As shown in FIG. 7, the cartridge-side shutter 102 covers the toner outlet port 101 before mounting the toner cartridge 100 in the machine main body or after dismounting it.

A toner scattering prevention seal 103 is attached to the toner outlet port 101 of the constricted portion at one end of the toner cartridge 100.

The cartridge-side shutter can have a through hole. That is, before the toner cartridge 100 is mounted in the machine main body, the cartridge-side shutter covers the toner outlet port 101. In mounting, the cartridge-side shutter moves axially to align the through hole with the toner outlet port 101.

Figure 8:
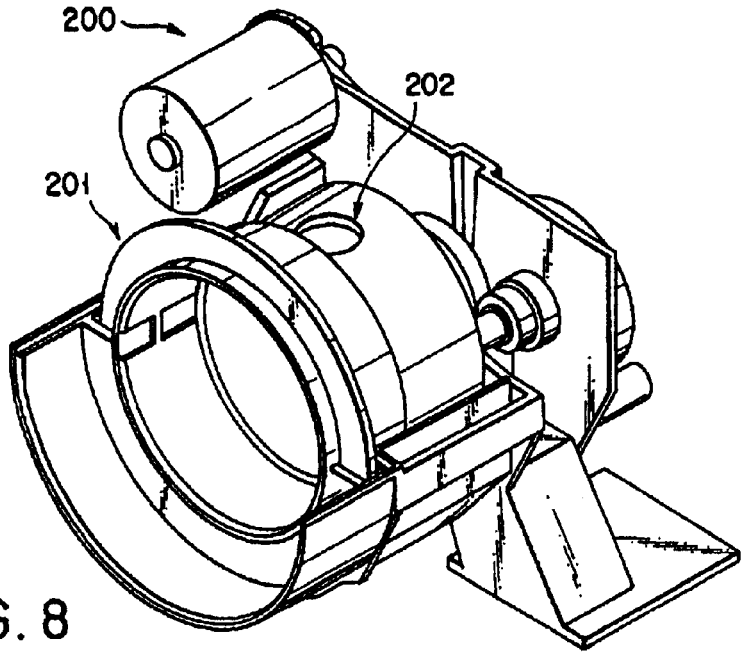
FIG. 8 is a perspective view showing a toner cartridge driving mechanism on the apparatus main body side according to the embodiment of the present invention.

FIG. 8 is a perspective view showing a toner cartridge driving mechanism on the machine main body side. In FIG. 8, a main body-side toner cartridge driving mechanism 200 has a coupling structure formed integrally with a main body-side shutter 201, which has a main body-side shutter opening 202. The constricted portion at one end of the toner cartridge 100 fits with the main body-side shutter 201 so as to align the toner outlet port 101 with the main body-side shutter opening 202. Accordingly, the toner cartridge 100 is mounted in the machine main body.

Before the toner cartridge 100 is mounted in the machine main body, the cartridge-side shutter 102 covers the toner outlet port 101, as shown in FIG. 7. In mounting, the cartridge-side shutter 102 is pressed by the main body-side shutter 201 to slide and retract axially, thereby exposing the toner outlet port 101, as shown in FIG. 6.

The main body-side shutter 201 is rotated by the driving mechanism 200 to transfer the rotational force to the toner cartridge 100. The toner replenishment port (not shown) of the machine main body is formed below the main body-side shutter 201. Every time the main body-side shutter opening 202 and toner outlet port 101 rotate and face down, toner in the toner cartridge 100 is discharged from the toner outlet port 101 and main body-side shutter opening 202. The toner is supplied to the machine main body through the toner replenishment port of the machine main body. In other words, the toner is intermittently supplied by rotation of the toner cartridge 100.

The toner cartridge driving mechanism 200 having the coupling structure formed integrally with the main body-side shutter 201 can decrease the number of components for rotating the toner cartridge 100, compared to a structure using a dedicated driving mechanism. This can reduce the product cost.

In dismounting the toner cartridge 100 from the machine main body, the cartridge-side shutter 102 is caught by the main body-side shutter 201 to slide forward and covers the toner outlet port 101. For this reason, toner does not scatter in dismounting the toner cartridge 100 from the machine main body.

To effectively replenish the developing unit with toner in the toner cartridge 100, a diameter a of the toner outlet port 101 of the toner cartridge 100, a diameter b of the main body-side shutter opening 202, and a diameter c of the toner replenishment port of the machine main body preferably satisfy a relation of $a \leqq b \leqq c$. When the hole is also formed in the cartridge-side shutter 102, as described above, a diameter d of this hole and the above holes preferably satisfy a relation of $a \leqq d \leqq b \leqq c$.

If the main body-side shutter 201 is made of an elastic material such as rubber, it can function as a vibration insulator, and airtightness between the main body-side shutter 201 and the toner cartridge 100 can be enhanced. A conventional main body-side shutter is made of a flexible material such as plastic, and this material cannot satisfactorily enhance airtightness. By changing such material to rubber (natural rubber or silicone rubber), thermal deformation can be greatly suppressed.

Figure 9:
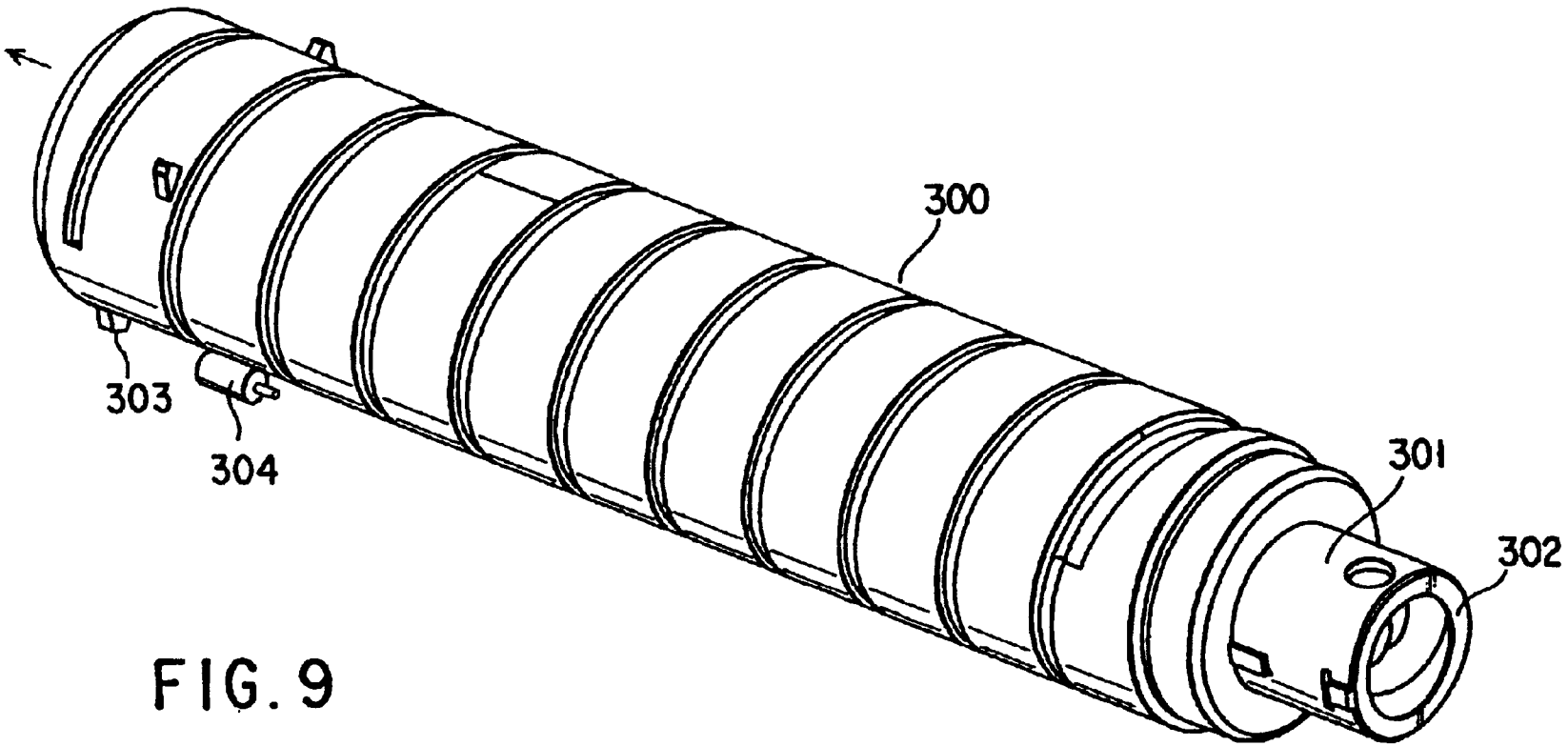
FIG. 9 is a perspective view showing a toner cartridge according to another embodiment of the present invention.

FIG. 9 is a perspective view showing a toner cartridge according to another embodiment of the present invention. In the toner cartridge shown in FIG. 9, a spiral 302 is formed on the inner surface of a constricted portion 301 of a toner cartridge 300 that fits with the machine main body. With this structure, the toner cartridge 300 is automatically dismounted from the machine main body by rotating the toner cartridge 300 counterclockwise.

In this case, claws 303 are attached near the other end of the toner cartridge 300. In counterclockwise rotation, the claws 303 are caught by the machine main body to stop rotation of the toner cartridge 300. However, the rotational force still acts to push the toner cartridge 300 in a direction indicated by an arrow by the operation of the spiral 302.

The toner cartridge 300 shown in FIG. 9 is axially supported by a roller 304. This roller 304 can be made of an elastic member such as rubber to obtain a high acoustic insulation effect.

Figure 10:
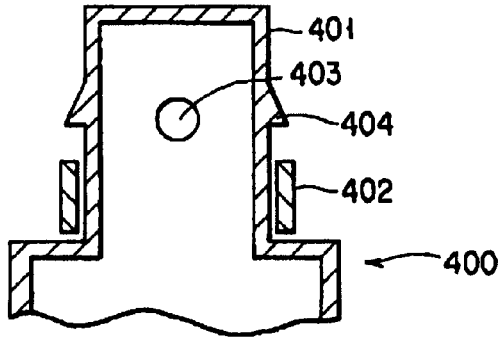
FIG. 10 is a sectional view showing part of a toner cartridge according to still another embodiment of the present invention.
Figure 11:
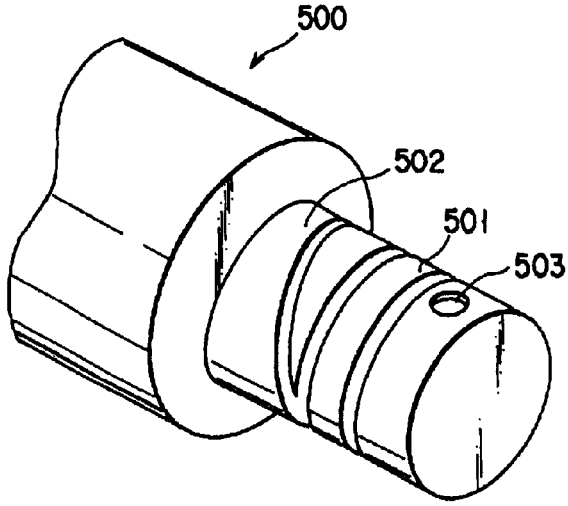
FIG. 11 is a perspective view showing part of the toner cartridge according to still another embodiment of the present invention.

FIGS. 10 and 11 are a sectional view and perspective view, respectively, showing the end of a toner cartridge according to still another embodiment of the present invention.

In a toner cartridge 400 shown in FIG. 10, a disconnection-prevention rib (projection) 404 is attached near the end of a constricted portion 401 of the toner cartridge 400 in order to prevent a cartridge-side shutter 402 from slipping off the constricted portion 401 of the toner cartridge 400. When the cartridge-side shutter 102 slides on the surface of the constricted portion 401 to close a toner outlet port 403, the disconnection-prevention rib 404 prevents the cartridge-side shutter 402 from slipping off the constricted portion 401 of the toner cartridge 400.

A position where the stopper rib 404 is formed is a position where the cartridge-side shutter 402 completely covers the toner outlet port 403 when the cartridge-side shutter 402 slides toward the constricted portion 401 to a maximum degree.

The stopper rib 404 may be formed into a ring shape on the entire constricted portion 401 of the toner cartridge 400, but may be one or a plurality of projections.

FIG. 11 shows still another embodiments of a toner cartridge having a disconnection-prevention structure for the cartridge-side shutter. In a toner cartridge 500 shown in FIG. 11, the surface of a constricted portion 501 and the inner surface of a cartridge-side shutter 502 are threaded. Rotation of the cartridge-side shutter 502 moves the cartridge-side shutter 502 to open/close a toner outlet port 503. Movement of the cartridge-side shutter 502 is stopped at an unthreaded portion.

As has been described in detail above, the toner cartridge of the present invention has two, cartridge-side shutter and main body-side shutter. Before mounting the toner cartridge in the developing unit, the toner outlet port of the toner cartridge is kept closed by the cartridge-side shutter. The toner replenishment port of the developing unit is kept closed by the main body-side shutter. Only in mounting/dismounting the toner cartridge on/from the developing unit, the toner outlet port of the toner cartridge and the toner replenishment port of the developing unit are opened/closed. Accordingly, toner can be effectively prevented from scattering in the developing unit in mounting/dismounting the toner cartridge on/from the developing unit.

Since the toner cartridge driving mechanism and main body-side shutter are integrated, the number of components can be decreased to reduce the cost.

Further, if particularly the main body-side shutter is made of an elastic material, it can function as a vibration isolator. At the same time, airtightness between the main body-side shutter and toner cartridge can be enhanced. Thermal deformation can also be greatly suppressed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

[1. A developer cartridge which is inserted in a direction of a rotating axis thereof and rotatably mounted in a developing unit of an image forming apparatus, and supplies a developer to said developing unit while rotating, comprising a cylindrical cartridge main body having a developer outlet hole in an outer surface near one end, and a ring-like cartridge-side shutter which is fitted on the outer surface near said one end of said cylindrical cartridge main body to be movable along said direction of the rotating axis between a position where the developer outlet hole is opened and a position where the developer outlet hole is closed, wherein said developing unit has a guide for inserting said developer cartridge and a driving unit for rotating said developer cartridge, said guide has a main body-side shutter with a hole, and when said developer cartridge is inserted, said cartridge-side shutter of said cylindrical cartridge main body moves from the position where the developer outlet hole is closed to the position where the developer outlet hole is opened, the developer outlet hole aligns itself with the hole of said main body-side shutter, and every time said cylindrical cartridge main body and said main body-side shutter integrally rotate to align the developer outlet hole and the hole of said main body-side shutter with a developer replenishment port formed below said main body-side shutter, the developer in said developer cartridge is supplied from the developer replenishment port to said developing unit via the developer outlet hole and the hole of said main body-side shutter.]

[2. A developer cartridge according to claim 1, wherein a diameter a of the developer outlet hole, a diameter b of the hole of said main body-side shutter, and a diameter c of the developer replenishment port satisfy a relation of $a \leqq b \leqq c$.]

[3. A developer cartridge according to claim 1, wherein said cartridge-side shutter has a hole, and fits on said cylindrical cartridge main body so the hole is movable between an opening position where the hole aligns itself with the developer outlet hole and a closing position.]

[4. A developer cartridge according to claim 3, wherein a diameter a of the developer outlet hole, a diameter d of the hole of said cartridge-side shutter, a diameter b of the hole of said main body-side shutter, and a diameter c of the developer replenishment port satisfy a relation of $a \leqq d \leqq b \leqq c$.]

[5. A developer cartridge according to claim 1, wherein a spiral is formed on an inner surface of said cylindrical cartridge main body.]

[6. A developer cartridge according to claim 1, wherein said guide and said driving unit are integrated.]

[7. A developer cartridge according to claim 1, wherein a toner scattering prevention seal is attached near the developer outlet hole of said cylindrical cartridge main body.]

[8. A developer cartridge according to claim 1, wherein said main body-side shutter is made of an elastic material.]

[9. A developer cartridge which is rotatably mounted in a developing unit of an image forming apparatus, and supplies a developer to said developing unit while rotating, comprising a cylindrical cartridge main body having a developer outlet hole in an outer surface near one end, and a ring-like cartridge-side shutter which is fitted on the outer surface near said one end of said cylindrical cartridge main body to be movable along a rotating shaft of said cylindrical cartridge main body between a position where the developer outlet hole is opened and a position where the developer outlet hole is closed, wherein said developing unit has a guide for inserting said developer cartridge and a driving unit for rotating said developer cartridge, said guide has a main body-side shutter with a hole, and when said developer cartridge is mounted, said cartridge-side shutter of said cylindrical cartridge main body moves from the position where the developer outlet hole is closed to the position where the developer outlet hole is opened, the developer outlet hole aligns itself with the hole of said main body-side shutter, and every time said cylindrical cartridge main body and said main body-side shutter integrally rotate to align the developer outlet hole and the hole of said main body-side shutter with a developer replenishment port formed below said main body-side shutter, the developer in said developer cartridge is supplied from the developer replenishment port to said developing unit via the developer outlet hole and the hole of said main body-side shutter, wherein said cylindrical cartridge main body is supported by a roller which is in contact with the outer surface and made of an elastic material.]

[10. A developer cartridge according to claim 1, wherein a projection for preventing said cartridge-side shutter from slipping off is formed on the outer surface near said one end of said cylindrical cartridge main body.]

[11. A developer cartridge according to claim 1, wherein an inner surface of said cartridge-side shutter and a surface of said cylindrical cartridge main body along which said cartridge-side shutter moves are threaded to mesh with each other, and said cartridge-side shutter is rotated to move on the surface of said cylindrical cartridge main body and stops at an unthreaded portion.]

[12. An image forming apparatus comprising a developing unit for developing an electrostatic latent image on an image bearing body with a developer, and a transfer unit for transferring the developed developer image onto a transfer medium, wherein said developing unit has a developer cartridge which is inserted in a direction of a rotating axis thereof and rotatably mounted to supply the developer to said developing unit while rotating, a guide for inserting said developer cartridge, and a driving unit for rotating said developer cartridge;

said developer cartridge has a cylindrical cartridge main body having a developer inlet hole in an outer surface near one end, and a ring-like cartridge-side shutter which is fitted on the outer surface near said one end of said cylindrical cartridge main body to be movable along said direction of the rotating axis between a position where the developer outlet hole is opened and a position where the developer outlet hole is closed;

said guide has a main body-side shutter with a hole; and when said developer cartridge is inserted, said cartridge-side shutter of said cylindrical cartridge main body moves from the position where the developer outlet hole is closed to the position where the developer outlet hole is opened, the developer outlet hole aligns itself with the hole of said main body-side shutter, and every time said cylindrical cartridge main body and said main body-side shutter integrally rotate to align the developer outlet hole and the hole of said main body-side shutter with a developer replenishment port formed below said main body-side shutter, the developer in said developer cartridge is supplied from the developer replenishment port to said developing unit via the developer outlet hole and the hole of said main body-side shutter.]

[13. An image forming apparatus according to claim 12, wherein a diameter a of the developer outlet hole, a diameter b of the hole of said main body-side shutter, and a diameter c of the developer replenishment port satisfy a relation of $a \leqq b \leqq c$.]

[14. An image forming apparatus according to claim 12, wherein said cartridge-side shutter has a hole, and fits on said cylindrical cartridge main body so the hole is movable between an opening position where the hole aligns itself with the developer outlet hole and a closing position.]

[15. An image forming apparatus according to claim 14, wherein a diameter a of the developer outlet hole, a diameter d of the hole of said cartridge-side shutter, a diameter b of the hole of said main body-side shutter, and a diameter c of the developer replenishment port satisfy a relation of $a \leqq d \leqq b \leqq C$.]

[16. An image forming apparatus according to claim 12, wherein a spiral is formed on an inner surface of said cylindrical cartridge main body.]

[17. An image forming apparatus according to claim 12, wherein said guide and said driving unit are integrated.]

[18. An image forming apparatus according to claim 12, wherein a toner scattering prevention seal is attached near the developer outlet hole of said cylindrical cartridge main body.]

[19. An image forming apparatus according to claim 12, wherein said main body-side shutter is made of an elastic material.]

[20. An image forming apparatus according to claim 12, wherein a projection for preventing said cartridge-side shutter from slipping off is formed on the outer surface near said one end of said cylindrical cartridge main body.]

[21. An image forming apparatus according to claim 12, wherein an inner surface of said cartridge-side shutter and a surface of said cylindrical cartridge main body along which said cartridge-side shutter moves are threaded to mesh with each other, and said cartridge-side shutter is rotated to move on the surface of said cylindrical cartridge main body and stops at an unthreaded portion.]

[22. An image forming apparatus comprising a developing unit for developing an electrostatic latent image on an image bearing body with a developer, and a transfer unit for transferring the developed developer image onto a transfer medium, wherein s aid developing unit has a developer cartridge rotatably mounted to supply the developer to said developing unit while rotating, a guide for inserting said developer cartridge, and a driving unit for rotating said developer cartridge;

said developer cartridge has a cylindrical cartridge main body having a developer inlet hole in an outer surface near one end, and a ring-like cartridge-side shutter which is fitted on the outer surface near said one end of said cylindrical cartridge main body to be movable along a rotating shaft of said cylindrical cartridge main body between a position where the developer outlet hole is opened and a position where the developer outlet hole is closed;

said guide h as a main body-side shutter with a hole;

when said developer cartridge is mounted, said cartridge-side shutter of said cylindrical cartridge main body moves from the position where the developer outlet hole is closed to the position where the developer outlet hole is opened, the developer outlet hole aligns itself with the hole of said main body-side shutter, and every time said cylindrical cartridge main body and said main body-side shutter integrally rotate to align the developer outlet hole and the hole of said main body-side shutter with a developer replenishment port formed below said main body-side shutter, the developer in said developer cartridge is supplied from the developer replenishment port to said developing unit via the developer outlet hole and the hole of said main body-side shutter, wherein said cylindrical cartridge main body is supported by a roller which is in contact with the outer surface and made of an elastic material.]

*23. A toner bottle for use in an image forming apparatus to discharge toner from the toner bottle in the image forming apparatus, wherein the toner bottle is adapted for insertion into the image forming apparatus along a direction of a rotation axis of the toner bottle, the toner bottle comprising:*

*an elongated cylindrical body portion having an outer surface, said body portion having a rotation axis extending longitudinally of the cylindrical body portion defining the rotation axis of the toner bottle;*

*a first end portion at a first end of the cylindrical body portion, the first end portion including an end face;*

*a toner outlet port positioned at the first end portion;*

*a cartridge shutter position at the first end portion and configured to be axially movable, along the direction of the toner bottle rotation axis in response to the insertion of the toner bottle into the image forming apparatus, between a closed position that covers the toner outlet port and an open position that opens the toner outlet port; and*

*at least one disconnection prevention projection formed at the first end portion to limit axial movement of the cartridge shutter in a direction toward the end face, thereby preventing the cartridge shutter from disconnection from the toner bottle, when the cartridge shutter is located at the closed position.*

*24. The toner bottle of claim 23, further comprising a toner scattering prevention shield at the first end portion circumferentially extending only partially around the first end portion and having a hole aligned with the toner outlet port.*

*25. The toner bottle of claim 23, further comprising two projections that are positioned on the end face and extend axially outward from the end face and are configured to engage with a toner bottle driving unit in the image forming apparatus.*

*26. The toner bottle of claim 25, further comprising:*

*a second end portion at a second end of the cylindrical body portion opposite the first end portion along the direction of the rotation axis; and*

*an alignment projection formed at the second end portion for interrelating with a cooperating structure of the image forming apparatus to align the toner bottle with respect to the image forming apparatus upon insertion into the image forming apparatus.*

*27. The toner bottle of claim 23, wherein the first end portion has a diameter smaller than a diameter of the cylindrical body portion.*

*28. The toner bottle of claim 27, further comprising a spiral groove that extends continuously without breaks from adjacent the first end portion to adjacent a second end portion positioned at a second end of the cylindrical body portion opposite the first end portion along the direction of the rotation axis.*

*29. The toner bottle of claim 28, wherein the continuous spiral groove comprises a plurality of groove portions that extend parallel to one another in a direction circumferentially along the outer surface of the cylindrical body portion.*

*30. An image forming apparatus in combination with a toner bottle according to claim 23.*

*31. The toner bottle of claim 23, wherein the disconnection prevention projection is of a ring-shape.*

*32. The toner bottle of claim 23, wherein the disconnection prevention projection is of a projection-shape.*

* * * * *